US012747760B2

(12) United States Patent
Courville et al.

(10) Patent No.: US 12,747,760 B2
(45) Date of Patent: Sep. 29, 2026

(54) STROKING AND ARTICULATING CONSTANT VELOCITY JOINT ASSEMBLY

(71) Applicant: STEERING SOLUTIONS IP HOLDING CORPORATION, Saginaw, MI (US)

(72) Inventors: Jeffrey P. Courville, Frankenmuth, MI (US); Jon N. Miller, Merrill, MI (US); Jenny C. Ho, Midland, MI (US); Eduardo R. Mondragon-Parra, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 573 days.

(21) Appl. No.: 18/084,534

(22) Filed: Dec. 19, 2022

(65) Prior Publication Data

US 2024/0060538 A1 Feb. 22, 2024

Related U.S. Application Data

(60) Provisional application No. 63/399,100, filed on Aug. 18, 2022.

(51) Int. Cl.

*F16D 3/223* (2011.01)
*F16D 3/06* (2006.01)
*F16D 3/84* (2006.01)

(52) U.S. Cl.

CPC ............. *F16D 3/223* (2013.01); *F16D 3/065* (2013.01); *F16D 3/845* (2013.01); *F16D 2003/22326* (2013.01); *Y10S 464/906* (2013.01)

(58) Field of Classification Search

CPC .......... F16D 3/223; F16D 3/065; F16D 3/845; F16D 2003/22326; Y10S 464/906
USPC .......................................... 464/140, 145, 167
See application file for complete search history.

(56) References Cited

U.S. PATENT DOCUMENTS 1,022,909 A * 4/1912 Whitney ................. F16D 3/223 464/167
5,611,733 A 3/1997 Jacob et al.
6,306,045 B1 10/2001 Jabob
8,057,313 B2 * 11/2011 Jacob ..................... B60K 17/22 464/140

FOREIGN PATENT DOCUMENTS

DE 10210305 A1 12/2002

* cited by examiner

*Primary Examiner* — Greg Binda
(74) *Attorney, Agent, or Firm* — Dickinson Wright PLLC

(57) ABSTRACT

A constant velocity joint assembly includes an inner annulus having a first race and an outer annulus having a second race supporting the first race for pivotal movement relative to the second race about a pivot axis. A third race is provided by the outer annulus and a fourth race is provided by an interface member. A ball spline is disposed between the third race and the fourth race for axial stroking movement of the third race relative to the fourth race, wherein the ball spline is axially offset from the pivot axis. Separate boots seal and isolate the pivotal movement and the stroking movement from one another.

9 Claims, 4 Drawing Sheets

STROKING AND ARTICULATING CONSTANT VELOCITY JOINT ASSEMBLY

CROSS-REFERENCE TO RELATED APPLICATION

This application claims the benefit of U.S. Provisional Application Ser. No. 63/399,100, filed Aug. 18, 2022, which is incorporated herein by reference in its entirety.

BACKGROUND OF THE INVENTION

Constant velocity ("CV") stroking joints are used in front wheel drive systems for automotive vehicles, by way of example and without limitation. Power is transmitted from the transmission to the drive wheels via shaft assemblies, also referred to as half shaft assemblies. The shaft assemblies include CV joints at their inboard and outboard ends. The inboard CV joint is coupled to the transmission and the outboard CV joint is coupled to the drive wheels. During operation, the drive wheels move up and down and thus, provision must be made for both angular and axial movement of the shaft assemblies.

FIG. 4 illustrates a well-known Rzeppa-type stroking constant velocity joint, shown generally at 11. The well-known Rzeppa portion of the joint 11 includes a half shaft 13 on which an inner race 15 is mounted. The inner race 15 is accommodated within an inner housing, also referred to as intermediate race 17. The inner and intermediate races 15, 17 are formed with a series of axially and radially aligned curved ball grooves in which balls 19 are accommodated and restrained axially by a ball cage 21 to provide for angular pivotal movement of the inner race 15 relative to the intermediate race 17.

The intermediate race 17 is, in turn, accommodated within an outer housing, also referred to as outer race 23. The intermediate and outer races 17, 23 are formed with aligned axially extending ball channels 25, 27, respectively, in which rows of ball splines 29 are received for supporting the intermediate race 17 for relative axial stroking movements relative to the outer race 23. The ball splines 29 are radially outward from and radially aligned with the inner and intermediate races 15, 17 and the balls 19. Accordingly, a ball circle diameter (BCDa) of the ball splines 29 is larger than a BCDb of the balls 19 of the Rzeppa portion. The intermediate race 17 is fitted at its axial ends with a pair of retaining rings 18 which extend across the ball grooves to restrain the spline balls 19 against movement beyond the retaining rings 18. In operation, the intermediate race 17 is provided with a certain amount of free rolling axial stroke over which the spline balls 19 roll freely within the ball channels of the intermediate race 17. Additional axial travel of the intermediate race 17 between end stops of the outer race 23 is permitted beyond the range of free roll movement, but requires the spline balls 19 to skid or slide without rolling action along the ball channels once they confront one or the other retaining rings 18 carried on the ends of the intermediate race 17.

The Rzeppa-type stroking constant velocity joint further includes a single boot cover, referred to as boot 31, to inhibit ingress of contamination and egress of grease. The boot 31 provides for both joint angulation of the Rzeppa portion and stroking movement of the outer race 23 relative to the intermediate race 17 at the same time.

The aforementioned Rzeppa-type stroking constant velocity joint, although providing angulation and stroking movement, is generally limited to about 25 degrees of angulation, largely due to the relationship of the respective ball circle diameters BCDa, BCDb, and combined angulation and stroking (axial extension and contraction) of the single boot 31. Further, the joint is complex due to the number of components, and further requires a relatively large amount of grease (lubricant) directed to the radially aligned Rzeppa portion and stroking portion provided by splines balls 19.

It is an object of the present invention to improve upon the construction and performance of constant velocity stroking joints.

SUMMARY OF THE INVENTION

According to an aspect of the present disclosure, a constant velocity joint assembly comprises: an inner annulus having a first race and an outer annulus having a second race supporting the first race for pivotal movement relative to the second race about a pivot axis. A third race is provided by the outer annulus and a fourth race is provided by an interface member. A ball spline is disposed between the third race and the fourth race for axial stroking movement of the third race relative to the fourth race, wherein the ball spline is axially offset from the pivot axis.

In accordance with another aspect of the disclosure, a constant velocity joint assembly includes: an inner annulus having a first race and an outer annulus having a second race supporting the first race for pivotal movement relative to the second race about a pivot axis. A third race is provided by the outer annulus. An interface member provides a fourth race, and a ball spline is disposed between the third race and the fourth race for axial stroking movement of the third race relative to the fourth race. A shaft is fixed to and extends from the first race. A flexible first boot is operably coupled to the shaft and the outer annulus. The flexible first boot forms a seal between the shaft and the outer annulus and allows the shaft and the first race to pivot relative to the second race about the pivot axis. A flexible second boot is operably coupled to the outer annulus and the interface member. The flexible second boot forms a seal between the outer annulus and the interface member and allows the outer annulus to move in axial stroking relation relative to the interface member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the non-limiting embodiments of the invention that is embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
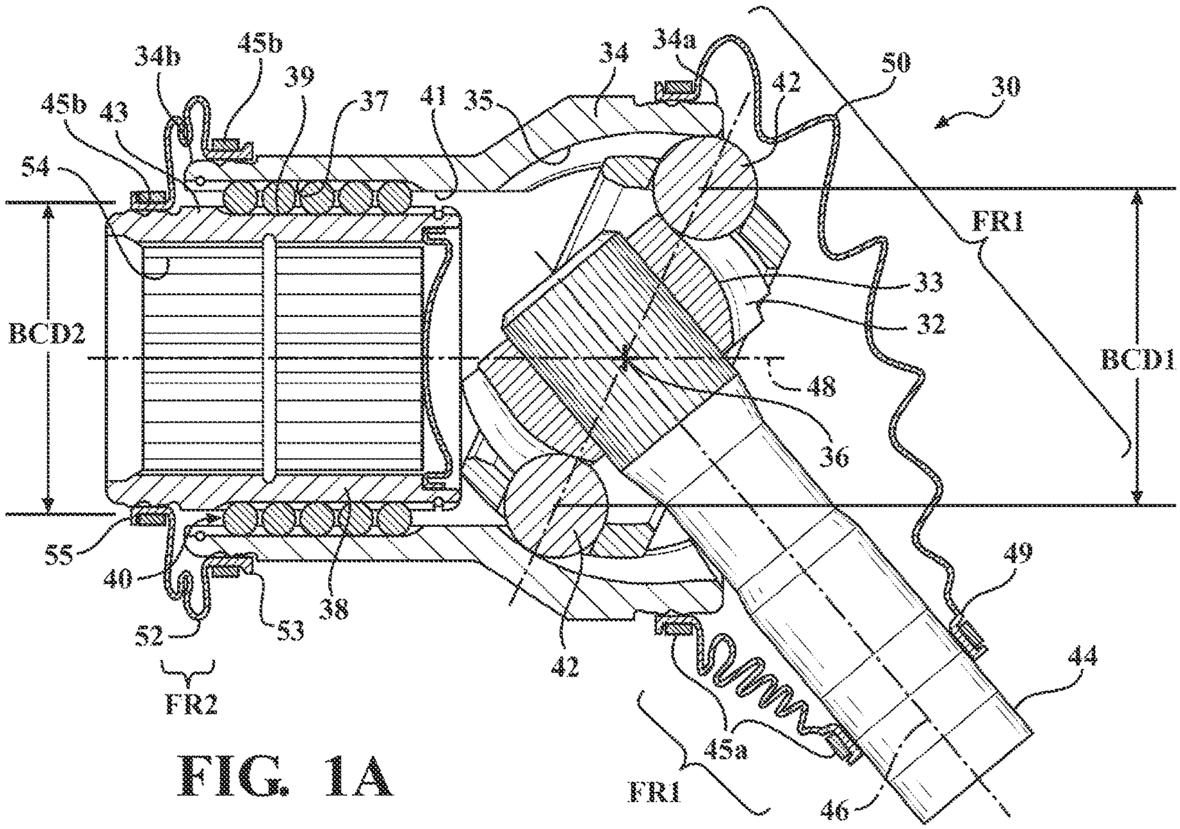
FIG. 1A is a cross-sectional view taken generally along a central axis of a constant velocity stroking joint constructed in accordance with one aspect of the disclosure shown in an axially compressed state.
Figure 1B:
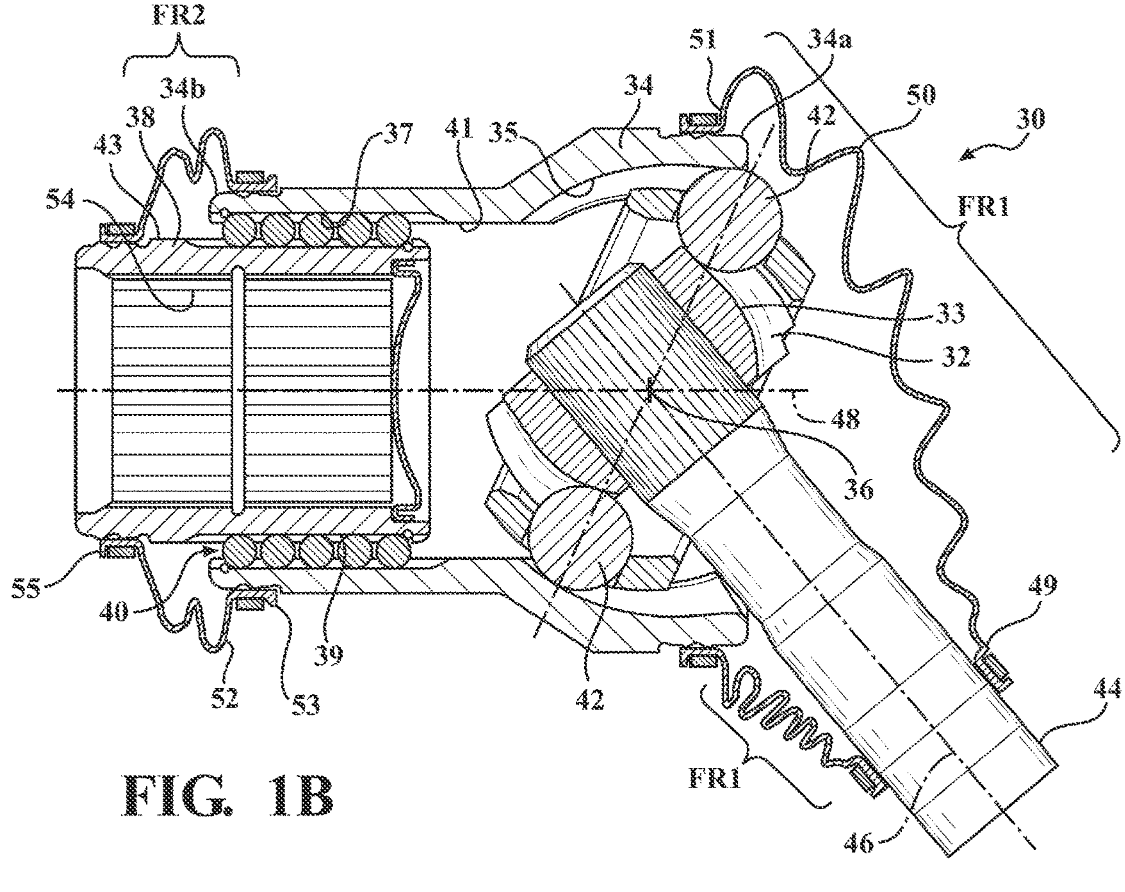
FIG. 1B is a view similar to FIG. 1A of the constant velocity stroking and articulating joint assembly shown in an axially extended state.

Referring to FIGS. 1A and 1B, a stroking and articulating constant velocity joint assembly 30, referred to hereafter as constant velocity joint assembly, constant velocity joint, or CVJ, constructed in accordance with one aspect of the disclosure is shown in axially compressed and axially extended states, respectively. The CVJ 30 includes an inner annulus 32 having an inner race, also referred to as first race 33, and an outer annulus 34 having an outer race, also referred to as second race 35, operably supporting the first race 33 to provide a pivot portion, also referred to as angulation portion, for pivotal movement (articulation) of the first race 33 relative to the second race 35 about a pivot axis 36. A third race 37 is provided on an inner surface 41 of the outer annulus 34 and a fourth race 39 is provided on an outer surface 43 of an interface member 38. At least one or a plurality of ball splines 40 is disposed between the third race 37 and the fourth race 39 to provide a stroking portion for axial stroking movement of the third race 37 and outer annulus 34 thereof relative to the fourth race 39 and interface member 38 thereof axially along a common central axis 48 of outer annulus 34 and interface member 38. The angulation portion and the stroking portion are decoupled from one another. The ball spline 40, and third and fourth races 37, 39 supporting the ball spine 40, are axially offset from the pivot axis 36 of the inner annulus 32. In the embodiment illustrated, the entirety of the ball spline 40 is axially offset, also referred to as axially shifted, from the pivot axis 36 throughout the entirely of stroking movement, and thus, the ball spline 40 does not radially overlie the pivot axis 36, thereby facilitating the ability of the CVJ 30 to be minimized is size (outer diameter) and weight. In the illustrated embodiment, the ball spline 40 is axially shifted in its entirety to the left from the pivot axis 36, as viewed in FIGS. 1A and 1B, such that an axis extending through the pivot axis 36 and perpendicular to the common central axis 48 does not intersect the ball spine 40. Accordingly, the ball spine 40 is not radially aligned with the pivot axis 36.

A plurality of rolling elements, such as spherical balls 42, are disposed between the first race 33 and the second race 35 to facilitate articulating (pivoting) movement between the first race 33 and the second race 35. The balls 42 have a first ball center diameter (BCD1). The ball spline 40 has a second ball center diameter (BCD2), wherein the first ball center diameter BCD1 is equal to or greater than the second ball center diameter BCD2, thereby facilitating the ability of the CVJ 30 to be minimized is size (outer diameter) and weight.

A shaft 44, such as a half shaft, by way of example and without limitation, is fixed to the inner annulus 32 and extends axially from the inner annulus 32 and the first race 33 along a shaft central axis 46. The shaft central axis 46 is coaxial with the outer annulus central axis 48 when the inner annulus 32 is aligned with the outer annulus 34, and the shaft central axis 46 is misaligned in inclined relation with the outer annulus central axis 48 when the inner annulus 32 is pivoted relative to the outer annulus 34 about the pivot axis 36.

The outer annulus 34 extends between opposite open ends 34*a*, 34*b*. A flexible first boot 50, also known as a first dust boot, has a first end 49 operably coupled to the shaft 44 and a second end 51 operably coupled to, such as being fixed to, the outer annulus 34, such as to an outer surface of the outer annulus 34 adjacent one of the opposite open ends 34*a*, by way of example and without limitation. The opposite first and second ends 49, 51 of the first boot 50 can be fixed to the respective shaft 44 and outer annulus 34 via any suitable fixation mechanism 45*a*, such as via hose clamps, or any other type of clamping band, by way of example and without limitation. The flexible first boot 50 forms an annular seal between the shaft 44 and the outer annulus 34, with the flexible first boot 50 having a first flexible region FR1, shown as a bellowed region, allowing the shaft 44 and the first race 33 to pivot relative to the second race 35 about the pivot axis 36. Accordingly, the second end 51 of the first boot 50 is fixed to the open end 34*a* of the outer annulus 34, with the first flexible region FR1 extending axially away from the outer annulus 34 to the first end 49 of the first boot 50 that is fixed to the shaft 44. As such, the first flexible region FR1 of the flexible first boot 50 is dedicated solely to allowing the shaft 44 and the first race 33 to pivot relative to the second race 35 about the pivot axis 36.

A flexible second boot 52, also known as a second dust boot, has a first end 53 operably coupled to, such as being fixed to, the other of the opposite ends 34*b* of the outer annulus 34 and a second end 55 operably coupled to the interface member 38. The opposite first and second ends 53, 55 of the flexible second boot 52 can be fixed to the respective outer annulus 34 and interface member 38 via any suitable fixation mechanism 45*b*, such as via hose clamps, or any other type of clamping band, by way of example and without limitation. The flexible second boot 52 forms an annular seal between the outer annulus 34 and the interface member 38 and has a second flexible region FR2, shown as a bellowed region, allowing the outer annulus 34 to move in axial stroking relation along the outer annulus central axis 48 relative to the interface member 38. Accordingly, the first end 53 of the second boot 62 is fixed to the open end 34*b* of the outer annulus 34, with the second flexible region FR2 extending axially away from the outer annulus 34 to the second end 55 of the second boot 52 that is fixed to the interface member 38. As such, the second flexible region FR2 of the flexible second boot 52 is dedicated solely to allowing the outer annulus 34 to move in axial stroking relation relative to the interface member 38.

In the non-limiting embodiment of FIGS. 1A and 1B, the first flexible boot 50 and the second flexible boot 52 are formed of separate pieces of material and are spaced axially out of contact from one another. As such, flexing movement of the first boot 50 is isolated from flexing movement of the second boot 52. Accordingly, the first and second boots 50, 52 are free to flex independently from one another, thereby having no effect on one another's ability to flex in the direction desired and to function as desired.

In the non-limiting embodiment of FIGS. 1A and 1B, the interface member 38 is a generally cylindrical member, by way of example and without limitation, having an inner female bore sized for fixed attachment to a male shaft (not shown). To facilitate coupling the interface member 38 to the male shaft, an inner surface 54 of the interface member 38 can be provided having axially extending splines for interdigitated fit with male splines on the male shaft, thereby preventing relative rotation between the interface member 38 and the male shaft.

Figure 2:
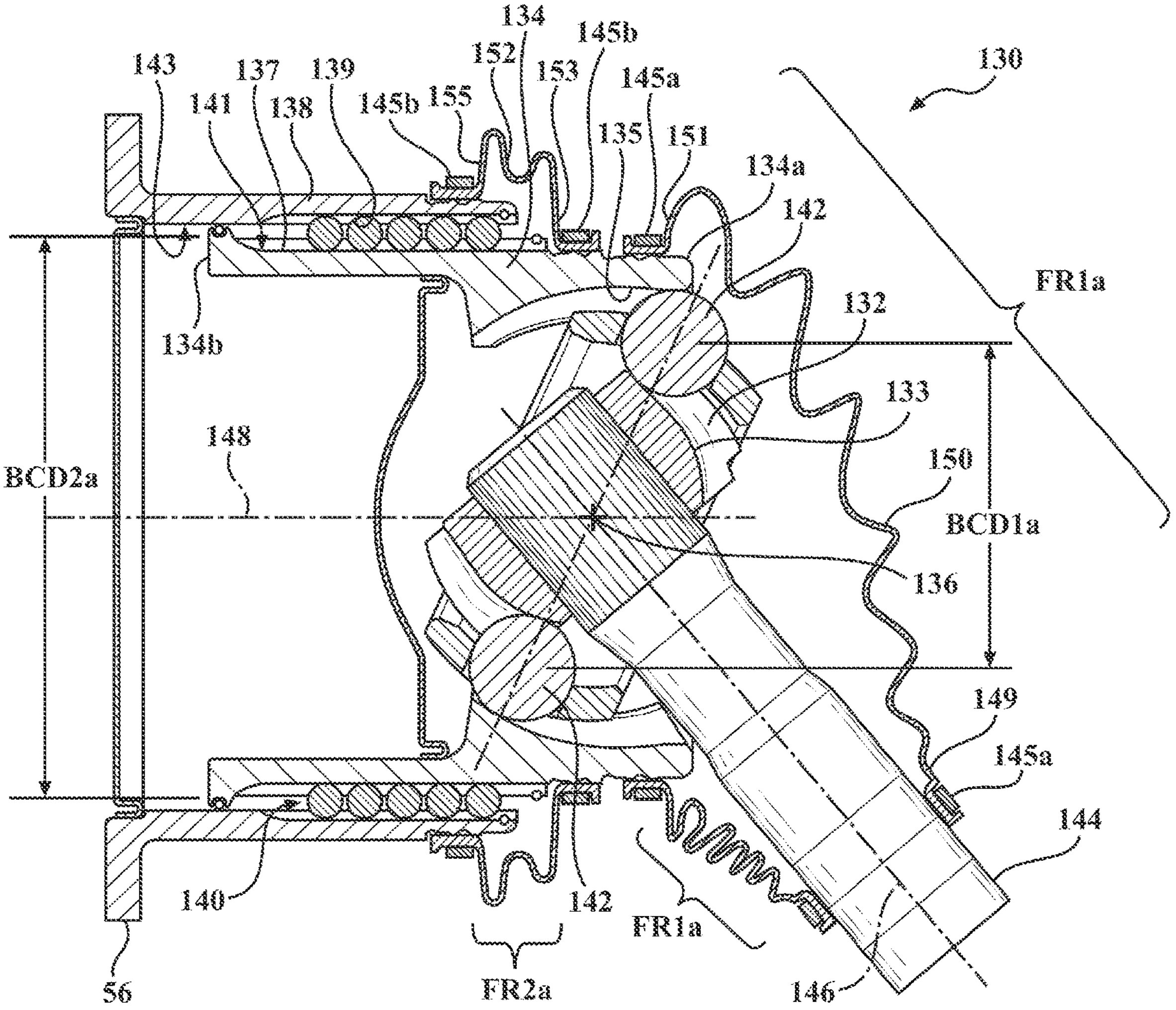
FIG. 2 is a cross-sectional view taken generally along a central axis of a constant velocity stroking and articulating joint assembly constructed in accordance with another aspect of the disclosure shown in an axially compressed state.

In FIG. 2, a stroking and articulating constant velocity joint assembly (CVJ) 130 constructed in accordance with another aspect of the disclosure is shown, wherein the same reference numerals, offset by a factor of 100, are used to identify like features.

The CVJ 130 is similar to the CVJ 30, including an inner annulus 132 having an inner race, also referred to as first race 133, and an outer annulus 134 having an outer race, also referred to as second race 135, operably supporting the first race 133 for articulating, also referred to as pivotal, movement of the first race 133 relative to the second race 135 about a fixed pivot axis 136. A third race 137 is provided on an outer surface 141 of the outer annulus 134 and a fourth race 139 is provided on an inner surface 143 of an interface member 138. At least one or a plurality of ball splines 140 is disposed between the third race 137 and the fourth race 139 for axial stroking movement of the third race 137 and outer annulus 134 thereof relative to the fourth race 139 and interface member 138 thereof along a common central axis 148 of outer annulus 134 and interface member 138. The ball spline 140, and third and fourth races 137, 139 supporting the ball spine 140, are axially offset (shifted) from the pivot axis 136 of the inner annulus 132, such as discussed above for the ball spline 40 and pivot axis 36.

A plurality of rolling elements, such as spherical balls 142, are disposed between the first race 133 and the second race 135 to facilitate articulating (pivoting) movement between the first race 133 and the second race 135. The balls 142 have a first ball center diameter (BCD1*a*). The ball spline 140 has a second ball center diameter (BCD2*a*), wherein the first ball center diameter BCD1*a* is less than the second ball center diameter BCD2*a*.

A shaft 144, such as a half shaft, by way of example and without limitation, is fixed to the inner annulus 132 and extends axially from the inner annulus 132 and the first race 133 along a shaft central axis 146. The shaft central axis 146 is coaxial, by way of example and without limitation, with an outer annulus central axis 148 when the inner annulus 132 is aligned with the outer annulus 134, and the shaft central axis 146 is misaligned with the outer annulus central axis 148 when the inner annulus 132 is pivoted relative to the outer annulus 134 about the pivot axis 136.

The outer annulus 134 extends between opposite open ends 134*a*, 134*b*. A flexible first boot 150 has a first end 149 operably coupled to the shaft 144 and a second end 151 operably coupled to, such as being fixed to, the outer annulus 134, such as to an outer surface of the outer annulus 134 adjacent one of the opposite open ends 134*a*, by way of example and without limitation. The opposite first and second ends 149, 151 of the flexible first boot 150 can be fixed to the respective shaft 144 and outer annulus 134 via any suitable fixation mechanism 145*a*, as discussed above for flexible first boot 50. The first boot 150 has a first flexible region FR1*a*, shown as a bellowed region that allows the shaft 144 and the first race 133 to pivot relative to the second race 135 about the pivot axis 136. A flexible second boot 152 has a first end 153 operably coupled to, such as being fixed to the outer surface of the outer annulus 134 adjacent the second end 151 of the first boot 150 and a second end 155 operably coupled to an outer surface of the interface member 138. The opposite first and second ends 153, 155 of the second boot 152 can be fixed to the respective outer annulus 134 and interface member 138 via any suitable fixation mechanism 145*b*, such as discussed above for the second boot 152. The second boot 152 forms an annular seal between the outer annulus 134 and the interface member 138 and has a second flexible region FR2*a*, shown as a bellowed region, that allows the outer annulus 134 to move in axial stroking relation along the outer annulus central axis 148 relative to the interface member 138. In the non-limiting embodiment, the first boot 150 and the second boot 152 are formed of separate pieces of material and are spaced axially from one another and out of contact from one another.

The interface member 138 has a generally cylindrical portion providing the fourth race 139 and a coupler flange 56 extending radially outwardly from the generally cylindrical portion for fixed attachment to a male shaft (not shown).

Figure 3:
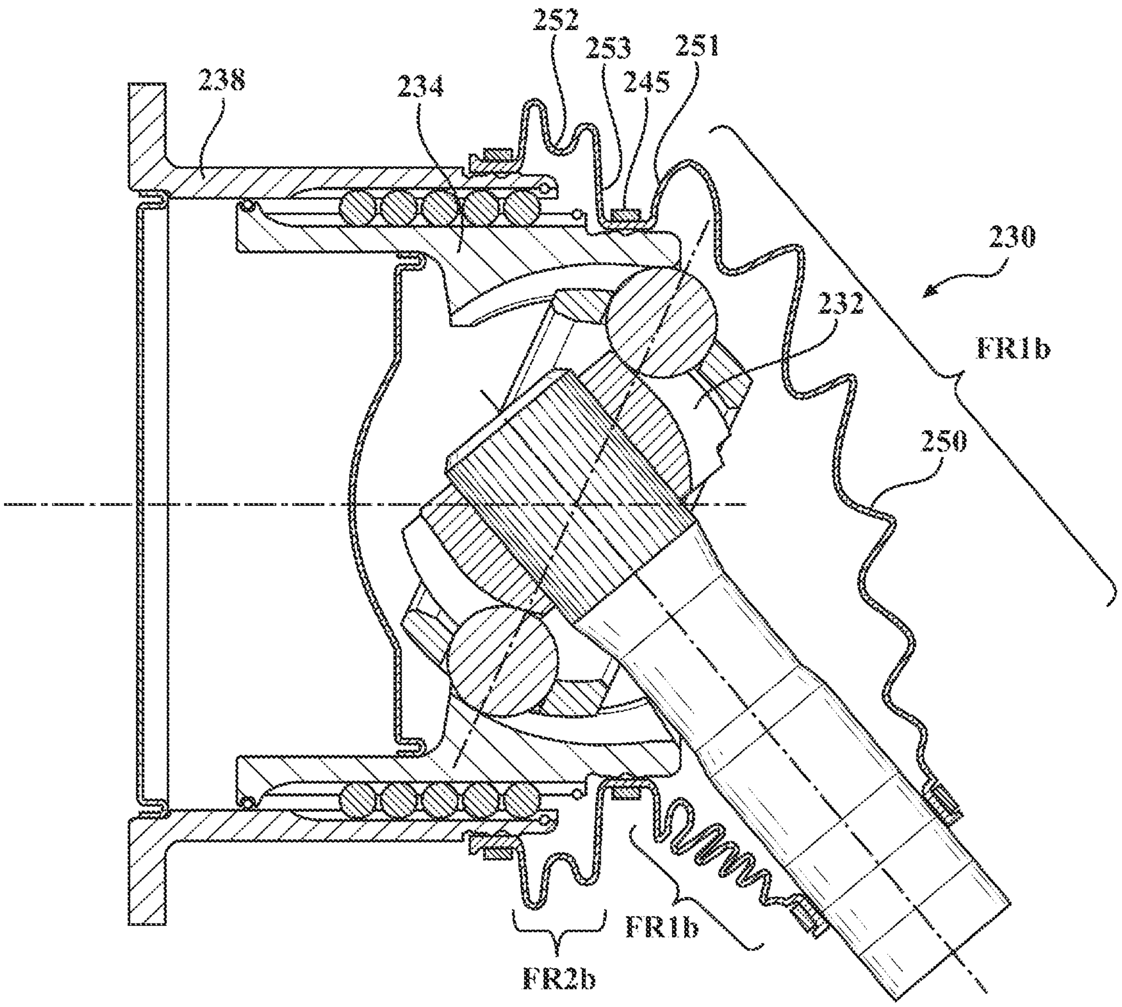
FIG. 3 is a cross-sectional view taken generally along a central axis of a constant velocity stroking and articulating joint assembly constructed in accordance with yet another aspect of the disclosure shown in an axially compressed state.
Figure 4:
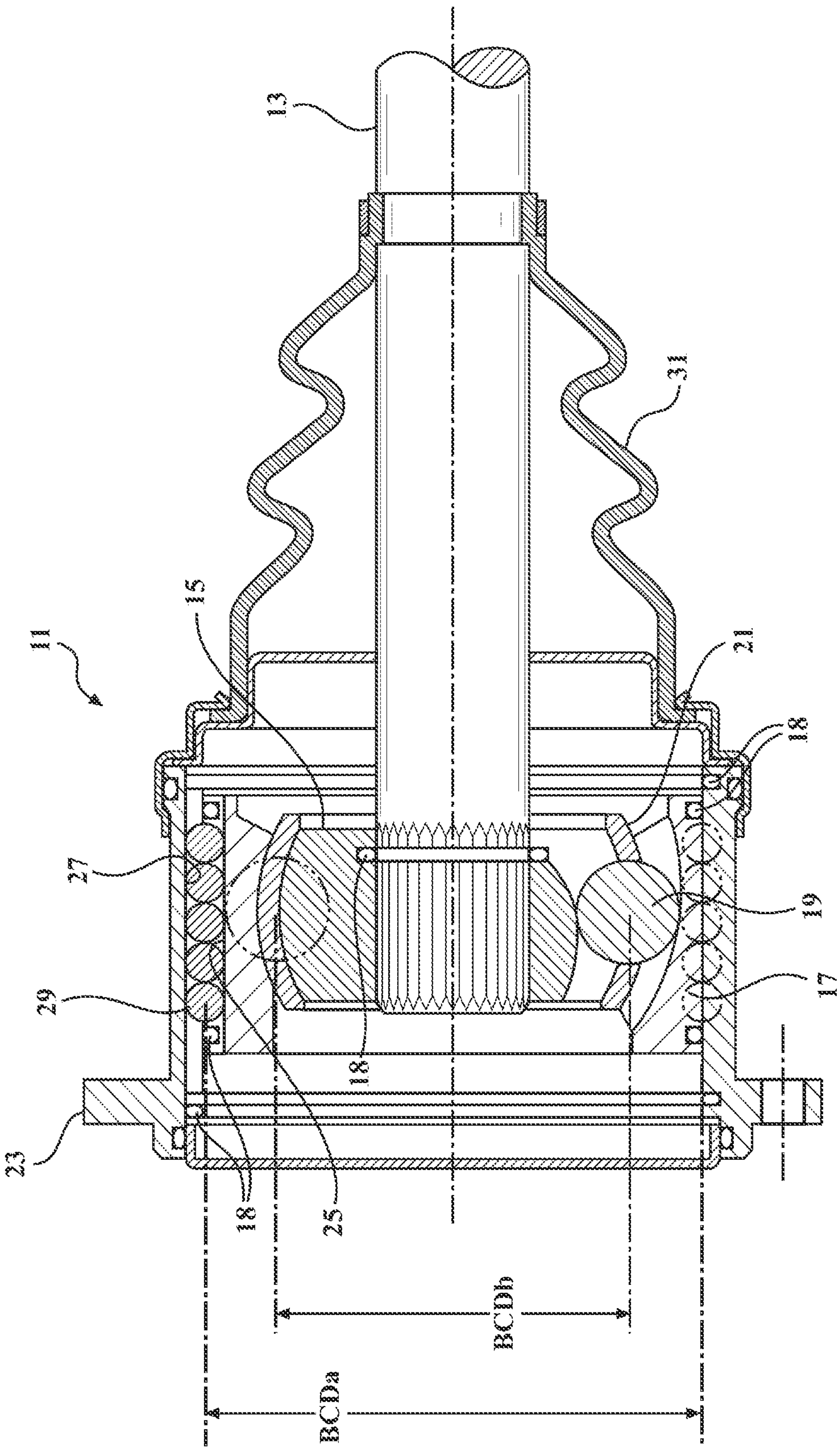
FIG. 4 PRIOR ART
FIG. 4 is a cross-sectional view taken generally along a central axis of a constant velocity stroking and articulating joint assembly constructed in accordance with the prior art shown in an axially compressed state.

In FIG. 3, a stroking and articulating constant velocity stroking joint assembly (CVJ) 230 constructed in accordance with another aspect of the disclosure is shown, wherein the same reference numerals, offset by a factor of 200, are used to identify like features.

The CVJ 230 is similar to the CVJ 130, however, rather than a flexible first boot 250 and a flexible second boot 252 being formed of separate pieces of material, the first boot 250 and the second boot 252 are formed of a monolithic (same, continuous piece of material) piece of material. Although the first boot 250 and the second boot 252 are formed of a single piece of material, the first boot 250 has a first flexible region FR1*b*, shown as a bellowed region, that functions to accommodate a pivoting movement between an inner annulus 232 and an outer annulus 234, while the second boot 252 has a second flexible region FR2*b*, shown as a bellowed region, that functions to accommodate axial movement during stoking of the outer annulus 234 relative to an interface member 238. To facilitate isolating and decoupling flexing movement of the first boot 250 and the second boot 252 from one another, a second end 251 of the first boot 250 and a first end 253 of the second boot 252 are fixed to an outer surface of the via any suitable single fixation mechanism 245, such as discussed above for the first and second boots 50, 52, 150, 152. Accordingly, the fixation mechanism 245 separates the first flexible region FR1*b* and the second flexible region FR2*b* from one another, thereby isolating respective flexing movements of the first flexible region FR1*b* of the first boot 250 and the second flexible region FR2*b* of the second boot 252 from one another, thereby preventing the movement of one of the boots 250, 252 from affecting the performance and movement of the other of the boots 250, 252. Accordingly, flexing of the first flexible region FR1*b* of the first boot 250 has no affect on flexing of the second flexible region FR2*b* of the second boot 252, and vice versa. Otherwise, the CVJ 230 is the same as discussed above for the CVJ 130.

In accordance with further aspects of the disclosure, the inner annulus and the outer annulus can be provided to form one of a Rzeppa type joint, such as having 6 or 8 balls, by way of example and without limitation, an undercut free type joint, a high efficiency type joint, such as having 6 or 8 balls, and/or having opposed ball tracks, by way of example and without limitation, and a high angle joint. Further, the ball spline can be provided having recirculation tracks, helical ball track(s), S-shaped tracks, and non-recirculating tracks. Further yet, the axial stroking portion can be contained within the outer race formed in part by the interface member 38, 138, 238, and can be provided having 3, 6, or 8 grooves, by way of example and without limitation.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description.

Having thus described the invention, it is claimed:

1. A constant velocity joint assembly, comprising:

an inner annulus having a first race;

an outer annulus provided as a monolithic piece of material, said outer annulus having a second race operably supporting said first race for pivotal movement of said first race relative to said second race about a pivot axis;

a third race provided by said outer annulus;

an interface member having a fourth race;

a ball spline disposed between said third race and said fourth race for axial stroking movement of said third race relative to said fourth race, wherein said ball spline is axially offset from said pivot axis;

a shaft fixed to and extending from said first race;

a flexible first boot operably coupled to said shaft and said outer annulus, said flexible first boot forming a seal between said shaft and said outer annulus and allowing said shaft and said first race to pivot relative to said second race about said pivot axis;

a flexible second boot operably coupled to said outer annulus and said interface member, said flexible second boot forming a seal between said outer annulus and said interface member and allowing said outer annulus to move in axial stroking relation relative to said interface member; and further including a plurality of balls disposed between said first race and said second race, said plurality of balls having a first ball center diameter, wherein said ball spline has a second ball center diameter, said first ball center diameter being greater than said second ball center diameter.

2. The constant velocity joint assembly of claim 1, wherein said flexible first boot and said flexible second boot are formed of separate pieces of material and are spaced out of contact from one another.

3. The constant velocity joint assembly of claim 2, wherein said outer annulus extends between opposite open ends, said flexible first boot being fixed to said outer annulus adjacent one of said opposite open ends, said flexible second boot being fixed to said outer annulus adjacent the other of said opposite open ends.

4. The constant velocity joint assembly of claim 1, wherein said third race is provided on an inner surface of said outer annulus and said fourth race is provided on an outer surface of said interface member.

5. The constant velocity joint assembly of claim 1, wherein said third race is axially spaced along a central axis of said outer annulus from said second race.

6. A constant velocity joint assembly, comprising:

an inner annulus having a first race;

an outer annulus provided as a monolithic piece of material, said outer annulus having a second race operably supporting said first race for pivotal movement of said first race relative to said second race about a pivot axis;

a third race provided by said outer annulus;

an interface member having a fourth race, said interface member extending axially between a first end and an opposite second end, said first end disposed in said outer annulus;

a ball spline disposed between said third race and said fourth race for axial stroking movement of said third race relative to said fourth race;

a shaft fixed to and extending from said first race;

a flexible first boot operably coupled to said shaft and said outer annulus, said flexible first boot forming a seal between said shaft and said outer annulus and allowing said shaft and said first race to pivot relative to said second race about said pivot axis; and a flexible second boot having a first end operably coupled to said outer annulus and a second end operably coupled to said interface member immediately adjacent said second end of said interface member, said flexible second boot forming a seal between said outer annulus and said interface member and allowing said outer annulus to move in axial stroking relation relative to said interface member.

7. The constant velocity joint assembly of claim 6, wherein said flexible first boot and said flexible second boot are formed of separate pieces of material and are spaced out of contact from one another.

8. The constant velocity joint assembly of claim 7, wherein said outer annulus extends between opposite open ends, said flexible first boot being fixed to said outer annulus adjacent one of said opposite open ends, said flexible second boot being fixed to said outer annulus adjacent the other of said opposite open ends.

9. The constant velocity joint assembly of claim 6, wherein said flexible first boot is dedicated solely to allowing said shaft and said first race to pivot relative to said second race about said pivot axis, and said flexible second boot is dedicated solely to allowing said outer annulus to move in axial stroking relation relative to said interface member.

* * * * *